United States Patent

[11] 3,566,136

| [72] | Inventors | Shin-ichi Kamachi; |
| | | Yuzi Ikuno, Tokyo, Japan |
| [21] | Appl. No. | 777,379 |
| [22] | Filed | Nov. 20, 1968 |
| [45] | Patented | Feb. 23, 1971 |
| [73] | Assignee | Olympus Optical Company, Ltd. |
| | | Tokyo, Japan |

[54] SYSTEM FOR DETECTING THE SENSE OF THE DIRECTION OF THE VARIATION IN PHASE OF A CYCLICALLY VARYING SIGNAL
5 Claims, 5 Drawing Figs.

[52] U.S. Cl.................................................. 250/220,
 250/231, 250/237
[51] Int. Cl...................................................... H01j 39/12
[50] Field of Search........................................... 250/237,
 237 (G), 208, 209, 220, 231; 324/83, 86, 87;
 356/110—112; 350/162 (R)

[56] References Cited
UNITED STATES PATENTS

| 2,886,717 | 5/1959 | Williamson et al. | 250/220 |
| 2,886,718 | 5/1959 | Shepherd et al. | 250/220 |
| 3,098,186 | 7/1963 | Williamson et al. | 250/237X |
| 3,227,888 | 1/1966 | Shepherd et al. | 250/237 |
| 3,351,768 | 11/1967 | Cooke | 250/237 |

*Primary Examiner*—Walter Stolwein
*Attorney*—Otto John Munz

ABSTRACT: System for detecting the sense of the direction in which the variation in the phase of a cyclically varying signal is occurring comprising the steps of detecting a first signal having a phase in advance of that of the cyclically varying signal by one-fourth of the cycle thereof and a second signal having a phase in retard of that of the first-mentioned cyclically varying signal by one-fourth of the cycle thereof, and producing two resultant signals having their phases relatively shifted from each other by one-fourth of the cycle of the first-mentioned cyclically varying signal by producing the vectorial differential respectively between the above-described first signal and the first-mentioned cyclically varying signal and between the same and the above-described second signal. The thus produced two resultant signals are used for detecting the sense of the variation in the phase of the first-mentioned cyclically varying signal. The accuracy is improved regardless of the drifts of the signal responding means used in the system, while the production cost is lowered by reducing the number of the signal responding means required as well as by increasing in latitude of the allowance of the sensitivity of the same.

INVENTOR
SHIN-ICHI KAMACHI
BY YUZI IKUNO
ATTORNEY 3,566,136

SYSTEM FOR DETECTING THE SENSE OF THE DIRECTION OF THE VARIATION IN PHASE OF A CYCLICALLY VARYING SIGNAL

BACKGROUND OF THE INVENTION

The present invention relates to a system for detecting the sense of the direction in which the variation in the phase of a cyclically varying signal is occurring.

In measuring a length digitally by counting the number of cyclically varying signals such as moire fringes generated by superposed diffraction gratings which are relatively moved in accordance with the movement of an object or a measuring head the displacement of which is to be detected, a problem arises in detecting in which sense the variation in the phase of the cyclically varying signal is occurring. In order to detect the sense of the direction in which the variation in the phase of the cyclically varying signal is occurring, two detecting signals are usually used which have their phases differed by $\pi 12$ i.e. one-fourth of the cycle of the cyclically varying signal from each other and which vary cyclically in the same cycle in accordance with the movement of an object or a measuring head the displacement of which is to be detected, so that the sense of the direction of the movement is detected by the condition or sequence of the variation in the relationship between the phases of the two detecting signals.

As described above, the moire fringes produced by superposing two diffraction gratings are moved as one of the diffraction gratings is moved relative to the other diffraction grating which is kept stationary. And, when the movable diffraction grating is moved in relation to the movement of an object or a measuring head the displacement of which is to be detected, the movement of the moire fringes are also related to the movement of the object or the measuring head so that the displacement or the length thereof can be detected by counting the number of the moire fringes which have been moved during the displacement of the object or the measuring head.

In order to carry out such a measurement, a light source and a collimating lens system is provided and the collimated light from the collimating lens system is directed to the pair of superposed diffraction gratings one of which is moved in relation to the movement of the object the displacement of which is to be detected. The moire fringes produced by the pair of diffraction gratings are focused on two photoelectric elements through a focusing lens system interposed between the pair of diffraction gratings and the photoelectric elements. The two photoelectric elements are spaced from each other in the direction perpendicular to the optical axis of the light incident to the photoelectric elements and parallel to the movement of the moire fringes by one-fourth of the distance between the adjacent two moire fringes thereby making it possible to carry out the above-described detection of the sense of the direction in which the variation in the phase of the moire fringes is occurring.

The two photoelectric elements each receiving the light through the moire fringes produce output signals each having a certain DC component with the phases thereof being differed by $\pi/2$ from each other. The thus produced output signals having their phases relatively shifted by $\pi/2$ to each other are used for detecting the sense of the direction in which the movable diffraction grating moves.

Since one cycle or one period of the cyclically varying electrical signal corresponds to the distance between the adjacent two lattices of the diffraction grating, the amount of the movement of the movable diffraction grating can be measured by counting the number of cycles of the electric signal. In such a method of measuring the amount of the movement, however, the DC component of the electrical signal might vary due to the variation in the intensity of the light source, imperfection of the lattices of the diffraction gratings or contamination of the diffraction gratings thereby frequently resulting in the malfunction of the DC amplifier connected to the detecting device.

In order to prevent the above-described malfunction from occurring, there has been heretofore proposed a measure in which further two photoelectric elements are provided which are arranged in a row together with the aforementioned two photoelectric elements such that the four photoelectric elements are spaced from each other successively in order by one-fourth of the distance between the adjacent two moire fringes, and the outputs of the first and the third photoelectric elements in the row are supplied to the inputs of a differential amplifier, respectively, while the outputs of the second and the fourth photoelectric elements are supplied to the inputs of a further differential amplifier thereby permitting the variation in the DC components of the outputs of the photoelectric elements to be compensated for so as to reduce the influence of the variation in the DC components.

In this case, however, the sensitivity of each of the photoelectric elements constituting each of the above-described pairs must be substantially fitted with each other, thus making it very difficult to practically achieve the above described object. Further, the cost of the photoelectric elements for the above described purpose are necessarily made high.

The present invention aims at avoiding or reducing the above-described disadvantages occurring in the detecting system of the type described above.

SUMMARY OF THE INVENTION

An object of the present invention is to provide a novel and useful system for detecting the sense of the direction in which the variation in the phase of a cyclically varying signal is occurring which avoids the above-described disadvantages of the prior art.

Another object of the present invention is to provide a novel and useful device for detecting the sense of the variation in the phase of a cyclically varying signal such as moire fringes produced by the two superposed diffraction gratings one of which is moved relative to the other stationary diffraction grating in accordance with the movement of an object the length of which is to be detected or a measuring head the displacement of which is to be detected for the measurement of the length of the object by counting the number of the cycles of the cyclically varying signal.

Further object of the present invention is to provide a novel and useful system of the type described above for detecting the sense of the variation in the phase of a cyclically varying signal which is efficient and accurate in operation and is carried out at low cost.

The object of the present invention is achieved in accordance with the present invention by providing a system for detecting the sense of the direction in which the variation in the phase of a cyclically varying signal is occurring, wherein a first signal having a phase in advance of that of the first-mentioned cyclically varying signal by one-fourth of the cycle thereof as well as a second signal having a phase in retard of that of the above-described cyclically varying signal by one-fourth of the cycle thereof is produced, two resultant signals being produced by vectorially subtracting the above-described cyclically varying signal from the above-described first signal and by vectorially subtracting the above-described second signal from the above-mentioned cyclically varying signal, the above-described two resultant signals having their phases shifted relative to each other by one-fourth of the cycle of the first-mentioned cyclically varying signal, the thus produced two resultant signals being used for detecting the sense o of the direction in which the variation in the phase of the first-mentioned cyclically varying signal is occurring, as described above.

The system of the present invention is not only effective in detecting the sense of the variation in the phase of the cyclically varying signal such as moire fringes by using only three-phase detecting means such as the photoelectric elements thereby lowering the production cost thereof but also is free from the deviation i.e. the straggling of the sensitivity of the phase detecting means used in the device of the present invention by virtue of the ingenious construction thereof.

DETAILED DESCRIPTION OF THE PREFERRED EMBODIMENT

Prior to the description of the present invention, the prior art detecting device will be described for the better understanding of the present invention.

Figure 1:
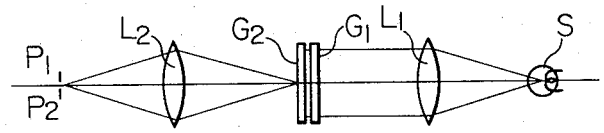
FIG. 1 is a view showing the principle of a detecting device of the prior art by which the amount of the movement as well as the sense of the movement of the diffraction grating is detected.
Figure 2:
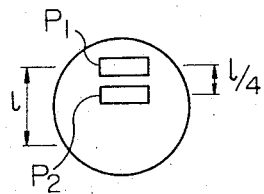
FIG. 2 is a view showing the relative positions of moire fringes focused on photoelectric elements and the photoelectric elements.

Referring to the drawings, particularly to FIG. 1 showing the conventional device for detecting the sense of the variation in the phase of the cyclically varying signal such as moire fringes, the light from a light source $S$ is collimated by means of a collimating lens system $L_1$ and is incident to the superposed two gratings $G_1$, $G_2$, one of which is stationary while the other is movable. The image of the moire fringes produced by the two diffraction gratings $G_1$, $G_2$ is focused on two photoelectric elements $P_1$, $P_2$ by means of a focusing lens system $L_2$. The two photoelectric elements $P_1$, $P_2$ are arranged in the direction of the movement of the moire fringes in spaced relationship from each other by the distance $l/4$, wherein the distance between the adjacent two moire fringes focused on the plane of the photoelectric elements $P_1$, $P_2$ is $l$.

As the movable diffraction grating is moved, the moire fringes produced thereby cause the two photoelectric elements $P_1$, $P_2$ to generate two cyclically varying electrical output signals each having a certain DC component and with the phases thereof being shifted by $\pi/2$ from each other. The thus produced cyclically varying signals having their phases shifted by $\pi/2$ from each other are necessary for determine the sense of the movement of the movable diffraction grating as is recognized by persons skilled in the art.

Since one cycle i.e. one period of the thus produced electrical signal corresponds to the distance between the adjacent two lattices of the diffraction gratings, the amount of the movement of the movable diffraction grating can be measured by counting the number of the cycles of the electrical signal. In this method, however, the DC component of the electrical signal varies due to the fluctuation of the intensity of the light source, imperfection of the lattices of the diffraction gratings or the contamination thereof. Therefore, the malfunction might often occur in the DC amplifier connected to the detecting means.

It has been proposed heretofore in order to prevent the above-described malfunction from taking place in the DC amplifier to provide two further photoelectric elements $P_3$, $P_4$ so that the four photoelectric elements $P_1$ to $P_4$ are arranged in that order in a row in the direction of the movement of the more moire fringes with the distance between the adjacent two photoelectric elements being set $l/4$, wherein $l$ is the distance between the adjacent two moire fringes. The electric signals derived from the two photoelectric elements $P_1$, $P_3$ are supplied to the input of a differential amplifier while the electric signals from the other two photoelectric elements $P_2$, $P_4$ are supplied to the input of another differential amplifier so that the fluctuation of the DC component of each of the electric signals derived from the photoelectric elements is compensated for.

In this case, the sensitivity each of the photoelectric elements $P_1$, $P_3$ forming the pair and that each of the photoelectric elements $P_2$, $P_4$ forming another pair must be substantially strictly fitted with each other, respectively, so that the production cost thereof is made high.

Figure 3:
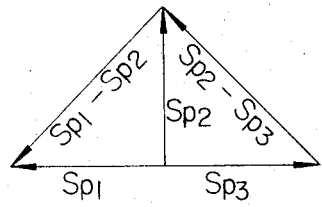
FIG. 3 is a diagram showing the vectors of the detecting signals in accordance with the present invention.

In order to avoid the above disadvantages, the present invention proposed to utilize only three photoelectric elements $P_1$, $P_2$ and $P_3$ arranged in a row in the direction of the movement of the moire fringes with the distance between the adjacent two photoelectric elements being set $l/4$, wherein $l$ is the distance between the adjacent two moire fringes. The electric signals $SP_1$, $SP_2$ and $SP_3$ generated by the respective photoelectric elements $P_1$, $P_2$ and $P_3$ are combined in such a manner that a vectorially resultant signal $SP_1 - SP_2$ and another vectorially resultant signal $SP_2 - SP_3$ are produced by vectorially subtracting the signal $SP_2$ from the signal $SP_1$ and by vectorially subtracting the signal $SP_3$ from the signal $SP_2$ as shown in FIG. 3. As seen in FIG. 3, the resultant signal $SP_1 - SP_2$ and the resultant signal $SP_2 - SP_3$ have their phases shifted by $\pi/2$ relative to each other assuming that the absolute value each of the signals $SP_1$, $SP_2$ and $SP_3$ is equal to each other, i.e. $|SP_1| = |SP_2| = |SP_3|$, and these two resultant signals $SP_1 - SP_2$, $SP_2 - SP_3$ are used for detecting the sense of the variation in the phase of the signal to be detected, i.e. the sense of the movement of the moire fringes in this case.

Now the advantages of the detecting device of the present invention utilizing only three photoelectric elements will be set forth hereinbelow in comparison with the detecting device of the prior art having four photoelectric elements.

As to the sensitivity of the detecting device, the value of each of the resultant signals $SP_1 - SP_2$, $SP_2 - SP_3$ of the present invention is $1/\sqrt{2}$ times smaller than that each of the resultant signals of the prior art having four photoelectric elements which are produced by vectorially subtracting the signal from the signal having its phase shifted by $\pi/2$ relative to each other. However, since the size each of the three photoelectric elements of the present invention can be made 4/3 times greater than that each of the four photoelectric elements of the prior art in the same effective area of the field in which the light from the moire fringes is incident so that the absolute value of the resultant signal is compensated for thereby making the difference between the absolute value of the resultant signal of the present invention and that of the prior art substantially negligible.

Next, the improvement in lessening the influence of the straggling or deviation of the sensitivity of the photoelectric elements on the accuracy of the detecting device of the present invention will be described below in comparison with the prior art.

Assuming that the ratio of the signal component of the moire fringes with respect to the DC component thereof is constant in the effective area of the field in which the light to be measured is incident, then the signal component $S$ can be expressed as follows:

$$S = \sin\theta + C,$$

wherein $C$ is the DC component determinable by the brightness obtained by the average light quantity for the signal while $\theta$ is the phase angle of the cyclically varying signal.

The signal $S$ is transformed to the electrical signal by means of the photoelectric element. Assuming that the sensitivities of the four photoelectric elements $P\ P_1$, $P_2$, $P_3$ and $P_4$ of the prior art are $A_1$, $A_2$, $A_3$ and $A_4$, respectively, the respective output signals $SP_1$, $SP_2$, $SP_3$ and $SP_4$ can be expressed by the following equations $$SP_1 = A_1 [\sin(\theta - \pi/2) + C] \quad (1)$$

$$SP_2 = A_2 [\sin(\theta) + C] \quad (2)$$
$$SP_3 = A_3 [\sin(\theta + \pi/2) + C] \quad (3)$$
$$SP_4 = A_4 [\sin(\theta + \pi) + C] \quad (4)$$

As described previously, the vectorial difference between the above signals $SP_1$ and $SP_3$ as well as the vectorial difference between the signals $SP_2$ and $SP_4$ is utilized for detecting the sense of the variation in the phase of the signal.

Thus, the input signal of the amplifier $SP_1 - SP_3$ is expressed as follows by using the above equations (1) and (3):

$$SP_1 - SP_3 = -(A_1 + A_3) \cos\theta + (A_1 - A_3) C \quad (5)$$

In contrast to the above, when only the three photoelectric elements $P_1$, $P_2$ and $P_3$ are used in accordance with the present invention as described above, the vectorial difference between the above $SP_1$ and $SP_2$ as well as the vectorial difference between the above $SP_2$ and $SP_3$ is used for detecting the sense of the variation in the phase of the signal.

Thus, the input signal $SP_1 - SP_2$ of the present invention is expressed as follows by using the above equations (1) and (2):

$$SP_1 - SP_2 = -\sqrt{A_1^2 + A_2^2} [\sin(\theta + \zeta)] + (A_1 - A_2) C \quad (6)$$

wherein
$$\zeta = \tan^{-1} A_1/A$$

In case these signals $SP_1 - SP_3$ and $SP_1 - SP_2$ are used for the measurement of a length, they are in general amplified and introduced in a Schmitt circuit in which triggering is effected at a predetermined level so that the wave form thereof is transformed to rectangular wave which is connected to a counting circuit so as to carry out the counting of the number of the cycles or periods of the signal.

The triggering level of the Schmitt circuit is conveniently selected to be $SP_1 - SP_3 = 0$, $SP_1 - SP_2 = 0$. These values are constant.

There arises a problem to what extent the phase of the moire fringes is shifted at the time of the triggering of the Schmitt circuit from that of the ideal case in which no straggling or the deviation of the sensitivities of the photoelectric elements exists due to the straggling or deviation of the sensitivities of the photoelectric elements.

In comparison of the above-described shifting of the phase in the detecting device of the present invention having only three photoelectric elements with that of the prior art in which four photoelectric elements are used, the calculation is carried as follows:

Putting the equations (5), (6) to be zero, then $$\cos\theta = \frac{k-1}{k+1} \cdot C \quad (7)$$

wherein $k = A_1 / A_3$, and $$\sin(\theta + \varphi) = \frac{k-1}{\sqrt{k^2+1}} \cdot C \quad (8)$$

wherein $k' = A_1 / A_2$,
$\zeta = \tan^{-1} A_1/A_2 = \tan^{-1} k'$.

The Schmitt circuit is triggered when the phase angle $\theta$ of the moire fringes satisfies the above equation (7) or 9 (8).

Assuming the ideal case in the equation (7) and putting the value of $A_1/A_3$ to be 1, then $$\theta = \pi/2.$$

And, if some straggling or deviation of the sensitivities of the photoelectric elements exists, then $$\theta = \cos^{-1}\frac{k-1}{k+1} \cdot C$$

thus the shifting of the phase $\Delta\theta$ from the value $\theta$ in the ideal case is:

$$\Delta\theta = \pi/2 - \cos^{-1}\frac{k-1}{k+1} \cdot C \quad (9)$$

When only the three photoelectric elements are used in accordance with the present invention, the above value $\Delta\theta$ is:

$$\Delta\theta = \pi/4 - \sin^{-1}\left\{\frac{k-1}{\sqrt{k^2+1}} \cdot C - \varphi\right\} \quad (10)$$

Figure 4:
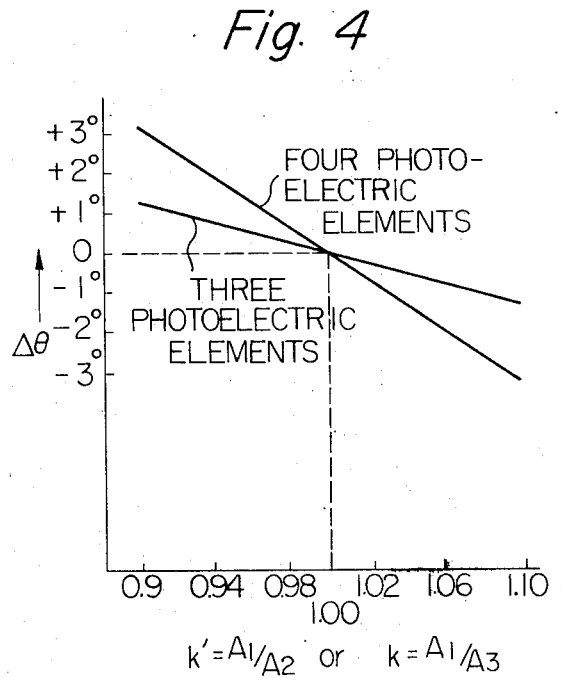
FIG. 4 is a diagram showing the comparison of the relationship between the shifting of the phase and the straggling of the sensitivity of the photoelectric elements at the triggering of the Schmitt circuit using three photoelectric elements in accordance with the present invention with that using four photoelectric elements in the prior art.

This means that the deviation of the sensitivities of the four photoelectric elements in the prior art is expressed directly in terms of $\Delta\theta$ while the value $\zeta$ is introduced as shown in the equation (10) when only the three photoelectric elements are used in accordance with the present invention thereby preventing the value of $\Delta\theta$ from being increased. These features are shown in FIG. 4. The curves shown in FIG. 4 are plotted when the ratio $C$ of the DC component of the moire fringes is selected to be the minimum, i.e. $c = 1$.

It is apparent from the equations (9), (10) that, the greater the value of $C$, the more the reduction in the shifting of the phase of the moire fringes from the ideal condition takes place at the time the triggering of the Schmitt circuit is effected.

As to the influences of the fluctuation of the intensity of the light source, the imperfection of the lattices of the diffraction gratings, and the contamination of the diffraction gratings, etc. on the accuracy of the device no difference exists in principle between the detecting device of the present invention utilizing only three photoelectric elements and that of the prior art in which four photoelectric elements are used.

Figure 5:
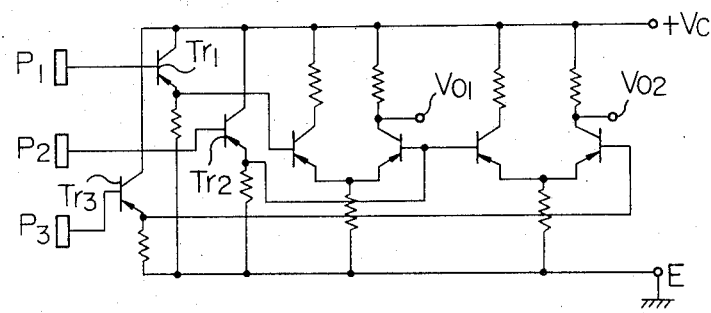
FIG. 5 is a diagram showing an embodiment of the circuit used in the present invention.

FIG. 5 shows an example of the electric circuit embodied the detecting device of the present invention, in which two differential amplifiers are used as in the case of the prior art detecting device utilizing four photoelectric elements.

The output signals from the three photoelectric elements $P_1$, $P_2$ and $P_3$ are current amplified by means of transistors $Tr_1$, $Tr_2$ and $Tr_3$, respectively, in order to prevent the variation in the outputs affected by the differential amplifiers connected thereto. The output signals from the transistors $Tr_1$, $Tr_2$ and $Tr_3$ have their phases shifted by $\pi/2$ from each other, and the output signal of the transistor $Tr_2$ which has its phase intermediate those of the transistors $Tr_1$ and $Tr_3$ is commonly used as the input to one terminal of each of the two differential amplifiers as shown in FIG. 5, while the other input terminal of each of the two differential amplifiers is connected to the output signals from the transistors $Tr_1$ and $Tr_3$, respectively.

The output of each of the differential amplifiers is designated by $Vo_1$, and $Vo_2$, respectively, and these two output signals $Vo_1$, $Vo_2$ have their phases shifted by $\pi/2$ from each other derived from the moire fringes which are used for detecting the sense of the direction in which the variation in the phase of the cyclically varying signal, i.e. the moire fringes in this case, takes place.

As described above, the detecting device of the present invention makes it possible to lower the production cost by reducing the number of the photoelectric elements required for the device while the errors caused by the deviation or the straggling of the sensitivities of the photoelectric elements incorporated in the device are lowered than in the case of the prior art in which four photoelectric elements are used. These are the characteristic features of the present invention.

Therefore, in accordance with the present invention, the amount of the movement of the diffraction grating movable in relation to the movement of the object to be inspected as well as the sense of the movement thereof can be exactly detected while stable and steady function is at all times insured without being affected by the fluctuation of the intensity of the light source and other straggling or drift in performances of the elements used.

We claim:

1. The method of detecting the sense of the direction in which the variation in the phase of a cyclically varying signal is occurring, wherein the improvement comprises the steps of detecting a first signal having a phase in advance of that of said cyclically varying signal by one-fourth of the cycle thereof and a second signal having a phase which lags that of said cyclically varying signal by one-fourth of the cycle thereof, and producing two resultant signals having their phases shifted by one-fourth of the cycle of said cyclically varying signal relative to each other by producing the vectorial differential of said first signal subtracted by said cyclically varying signal and the vectorial differential of said cyclically varying signal subtracted by said second signal, thereby permitting the sense of the variation in the phase of said cyclically varying signal to be detected by said two resultant signals.

2. System according to claim 1, wherein said cyclically varying signal and said first and second signals are electrical sinusoidal wave signals, the phase differences therebetween being $\pi/2$, respectively, so that the phase difference between said two resultant signals is $\pi/2$.

3. System according to claim 2, wherein said cyclically varying signal is derived from a photoelectric element which receives light from a light source through moire fringes generated by two superposed diffraction gratings and moved across the optical path of the light by the relative movement of said diffraction gratings caused in accordance with the movement of an object the displacement of which is to be detected, said first signal being derived from a photoelectric element located in advance of said first mentioned photoelectric element in the direction of the movement of said moire fringes by one-fourth of the distance between adjacent fringes thereof while said second signal is derived from a further photoelectric element located lagging said first mentioned photoelectric element in the direction of the movement of said moire fringes by one-fourth of the distance between adjacent fringes thereof.

4. System for detecting the sense of the direction in which the variation in the phase of a cyclically varying signal is taking place, wherein the improvement comprises three signal responding means arranged in said system to receive said cyclically varying signal so that they produce the respective output signals with the phases thereof being shifted by one-fourth of the cycle of said cyclically varying signal from each other, and two differential means connected to said three signal responding means such that a vectorial differential of the first output signal with respect to the second output signal having its phase in advance of said first output signal by one-fourth of the cycle is produced by one of said two differential means while the other of said two differential means produces another vectorial differential of said second output signal with respect to the third output signal having its phase lagging said second output signal by one-fourth of the cycle so that two resultant vectorial differentials are provided having their phases shifted by one-fourth of the cycle from each other, said two resultant vectorial differentials being used for detecting the sense of the direction of the variation in the phase of said first-mentioned cyclically varying signal.

5. System according to claim 4, wherein said cyclically varying signal is moire fringes and said three-signal responding means are photoelectric elements while said two differential means are differential amplifier, a transistor is interposed between each of the photoelectric elements and the corresponding differential amplifier connected thereto so as to prevent the variation in the input to the respective differential amplifier supplied from each of said photoelectric elements.